United States Patent [19]
Kozima et al.

[11] 4,439,316
[45] Mar. 27, 1984

[54] WATER PURIFIER

[75] Inventors: Sadao Kozima, Tokyo; Hisao Makino, Chiba, both of Japan

[73] Assignee: Kaiyo Koggyo Co. Ltd., Tokyo, Japan

[21] Appl. No.: 388,471

[22] Filed: Jun. 14, 1982

[51] Int. Cl.³ .............................................. C02F 3/06
[52] U.S. Cl. .................................... 210/150; 210/194; 210/220; 261/77; 261/112; 261/120
[58] Field of Search ...................... 210/521, 522, 242.2, 210/242.1, 220, 221.1, 221.2, 150, 151, 615, 194; 261/36 R, 77, 112, 120, DIG. 11; 55/387

[56] References Cited

U.S. PATENT DOCUMENTS

| | | | |
|---|---|---|---|
| 2,825,691 | 4/1958 | Fischer | 210/221.1 |
| 3,217,471 | 11/1965 | Silverman | 55/387 |
| 3,227,429 | 4/1966 | Renzi | 261/DIG. 11 |
| 3,628,775 | 12/1971 | McConnell | 261/77 |
| 3,966,608 | 6/1976 | Mason et al. | 261/94 |
| 4,073,696 | 2/1978 | Muller | 261/93 |
| 4,183,787 | 1/1980 | Roester et al. | 261/77 |
| 4,187,263 | 2/1980 | Lipert | 261/77 |
| 4,346,005 | 8/1982 | Zimmerman | 210/521 |
| 4,356,131 | 10/1982 | Lipert | 261/77 |

FOREIGN PATENT DOCUMENTS

2416773 10/1975 Fed. Rep. of Germany ...... 210/220
2844039 4/1980 Fed. Rep. of Germany ... 210/242.2

Primary Examiner—Peter A. Hruskoci
Assistant Examiner—Sharon T. Cohen
Attorney, Agent, or Firm—Wenderoth, Lind & Ponack

[57] ABSTRACT

A water purifier comprising a cylinder provided at its lower portion with an air chamber and water sucking holes and adapted to be intermittently supplied with compressed air and water, a honeycombed tube structure including a multiplicity of tubes arranged in a side-by-side relation concentrically around the cylinder and a protecting sleeve for protecting the honeycombed tube structure. The protecting sleeve may be provided on its outer peripheral surface with a buoyancy chamber. A plurality of units of water purifier may be arranged in stages. In some cases, the water purifier is placed to occupy the whole space of a water tank into which the water to be treated is introduced continuously.

5 Claims, 9 Drawing Figures

WATER PURIFIER

BACKGROUND OF THE INVENTION

1. Field of the Invention

The present invention relates to a water purifier and, more particularly, to a water purifier having a cylinder into which compressed air and water are introduced intermittently, a honeycomb tube structure having a multiplicity of tubes arranged in a side-by-side relation around the cylinder, and a protecting sleeve for protecting the tube structure.

2. Description of the Prior Art

Hitherto, a tube-contact oxidation method has been developed as a method for cleaning and purifying contaminated river water or waste water from factories or the like. It has been confirmed that the tube contact oxidation method compares well in its effectiveness with a slow speed filter basin in which water to be cleaned flows in a recycling manner.

The tube contact oxidation method, however, suffers the following disadvantage. First of all, it is to be pointed out that a suitable means is required for generating the flow of water to be cleaned. Secondly, it is necessary to the flow rates of water in all tubes of the honeycomb tube structure uniform. Thirdly, it is necessary to take suitable measures for removing foreign matter which becomes attached to the surface of a biomembrane in each tube, as well as for removing dead or old biomembranes from in the tube. For these reasons, the tube contact oxidation method cannot be used satisfactorily in cleaning the water from lakes, marshes, speedboat race areas, swimming pools and so forth.

SUMMARY OF THE INVENTION

Accordingly, it is a primary object of the invention to provide an improved water purifier capable of eliminating the above-described problems of the prior art.

To this end, according to the invention, there is provided a water purifier comprising a cylinder provided with an air chamber and a water suction hole and adapted to to have compressed air and water intermittently introduced thereinto; a honeycomb tube structure having a multiplicity of tubes arranged around the cylinder in a side-by-side relation; and a protecting sleeve surrounding the tube structure.

The above and other objects, features and advantages of the invention will becme clear from the following description of the preferred embodiments taken in conjunction with the accomanying drawings.

BRIEF DESCRIPTION OF THE DRAWINGS

FIG. 6 is a schematic front elevational view of a water purifier disposed in a recess formed in the bottom of a swimming pool or the like;

FIG. 8 is a vertical sectional view of a system, some parts of which are omitted, and having a pair of water purifiers disposed in a water tank or the like.

DESCRIPTION OF THE PREFERRED EMBODIMENTS

Figure 1:
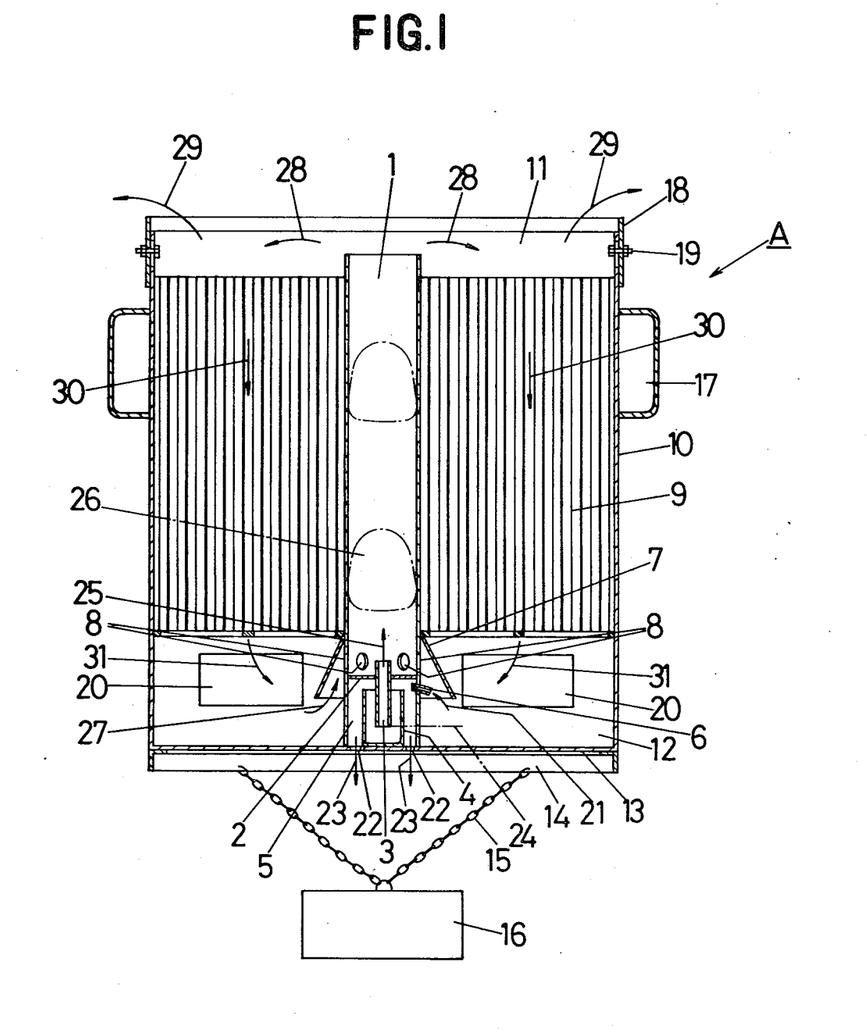
FIG. 1 is a vertical sectional front elevational view of a water purifier in accordance with the invention.

Referring first to FIG. 1, a water purifier generally designated at A has a cylinder 1 provided at its lower portion with an internal partition plate 2 and closed at its bottom by a bottom plate 13. The internal partition plate 2 and the bottom plate 13 cooperate with each other in defining therebetween an air chamber 5. A ventilation tube 3 extends through the central portion of the partition plate 2 such that the upper half of the ventilation tube 3 is in the cylinder 1 while the lower half in a sleeve 4 mounted on plate 13 and disposed in the air chamber 5 thereby to achieve an inverse siphon action.

An air supply tube 6 is fitted in a hole formed in an upper portion of the peripheral wall of the air chamber 5. A frusto-conical guide wall 7 has the upper end edge thereof fixed to the portion of the outer peripheral surface of the cylinder 1 above the partition plate 2. A plurality of water suction holes 8 are formed in the portion of the wall of the cylinder 1 at a regular circumferential pitch so as to face the inner side of the guide wall 7.

A honeycomb tube structure 9 has a multiplicity of vertical tubes packed densely in a side-by-side relation around the cylinder. The honeycomb tube structure 9 is protected by a protecting sleeve 10 surrounding the structure 9. The upper end of the protecting sleeve 10 projects above the upper end of the honeycomb tube structure 9 to form a dam wall 11. The lower end of the protecting sleeve 10 extends downwardly to a level below the lower end of the honeycomb tube structure 9 to form a sludge chamber 12 in cooperation with the bottom plate 13. A plurality of windows 20 are formed in the wall of the sludge chamber 12 to provide passages for fish gathering around bait such as algae or and biomembranes deposited in to the bottom of the sludge chamber. A weight is suspended by a chain 15 from a reinforcement girder 14 attached to the outer side of the bottom plate 13. On the other hand, a buoyancy chamber 17 is formed on and around the peripheral surface of the protecting sleeve 10. In use, the water purifier A as a whole is immersed in water and is kept correctly in an upright posture due to the balance of force between the buoyancy created by the buoyancy chamber 17 and the downward force of the weight 16. An auxiliary dam wall 18 is secured to the outer peripheral surface of the dam wall 11 by bolts 19 to increase to effective height of the bank.

Figure 2:
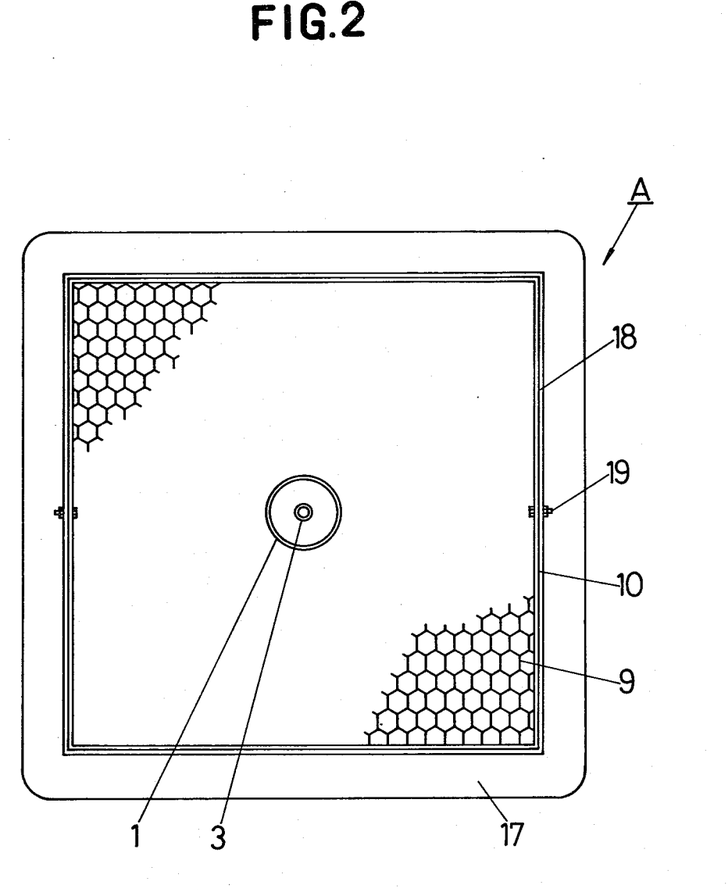
FIG. 2 is a schematic plan view of the water purifier shown in FIG. 1 with a portion thereof being omitted.

As will be seen best from FIG. 2, the honeycomb tube structure 9 is an integral body having a multiplicity of tubes each having a hexagonal cross-section and arranged in a manner like a honeycomb. Although not essential, it is preferred to use, as the material of the tube, a synthetic resin having a high impermeability to water and high corrosion resistance such as vinyl chloride resin. Also, the cylinder 1 and the protecting sleeve 10 are preferably made of a material which undergoes only small reduction of strength and corrosion when immersed in water for long time, e.g. synthetic resin, stainless steel or the like.

The water purifier of this embodiment has the construction described hereinbefore. In operation, compressed air is supplied from an external air source (not shown) into the air chamber 5 through the air supply tube 6 as indicated by the arrow 21. In consequence, the water to be treated residing in the air chamber 5 is displaced by the air and discharged to the outside through the hole 22 in the bottom plate 13 as indicated by arrows 23. In consequence, the water level is lowered down to the level of the lower end (chain line 24) of the ventilation tube 3 so that the compressed air in the air chamber is allowed to move upwardly in the direction of arrow 25 through the ventilation tube 3 to form successive masses or bubbles 26 of air. The water in the sludge chamber 12 is sucked into the cylinder 1 through the water suction holes 8 as the masses 26 of air ascend through the cylinder 1.

In consequence, as the compressed air in the air chamber 5 is intermittently displaced to the upper side of the partition plate 1 in the cylinder 1, the water to be treated residing in the cylinder 1 is intermittently pushed up while being sandwiched between the preceding mass 26 of air and the following mass 26 of air and overflows radially from the upper end of the cylinder 1 and falls onto the upper end of the honeycomb tube structure 9. A part of the water is discharged to the outside overflowing the auxiliary dam wall 18 as indicated by the arrow 29 while the remainder flows down along the tubes of the tube structure 9 as indicated by the arrow 30 and is then introduced again into the sludge chamber 12. The water is then sucked again into the cylinder 1 through the water suction openings 8.

This operation is repeated continuously so that the water is purified through oxidation by direct contact with the biofilm deposited on the inner surfaces of the tubes of the honeycomb tube structure 9 during operation.

The diameter of the tubes constituting honeycomb tube structure is preferably small because the total area of the biofilm contacting the water is thereby increased. However, too small a diameter of the tube may cause clogging and, hence, is not preferred. From a practical point of view, the diameter, i.e. the distance between opposite sides of the hexagonal cross-section tubes, is selected to range between 20 and 30 mm.

It is considered that the treating capacity is increased as the length of the honeycomb tube structure is increased. The length of the honeycomb tube structure, however, is selected in relation to the water depth to range between 1 and 4 meters. Considering the pumping or sucking capacity of the cylinder, as well as the limit for making the flow rates in the tubes of the honeycomb tube structure uniform, the cross-sectional area of the honeycomb tube structure should be selected to fall between 1 m$^2$ and 16 m$^2$. In addition, the tube structure 9 can have not only a square cross-section as illustrated but also a circular cross-section.

In the operation of the water purifier of the invention, it is essential that the water to be treated is recycled as many times as possible through the tube structure 9. However, for recycling the whole part of the water which has passed through the honeycomb tube 9 structure back to the same, it would be necessary to install the honeycombed tube structure over the entire area of the water to be purified. To avoid this inconvenience, according to the invention, the honeycomb tube structure is given a size so as to occupy only a part of the whole area of water, and a dam wall of a suitable height is provided on the outer peripheral surface of the upper end of the honeycomb tube structure, so that a part of the water coming out of the upper end of the cylinder is made to flow down along the honeycomb tube structure while the remainder is discharged. Meanwhile, new water to be treated is introduced at a constant rate. Consequently, the water is recycled through the honeycomb tube structure for several tens of times during its long stay in the water purifier and, hence, purified sufficiently before it is discharged to the outside.

In the case where the honeycomb tube structure occupies the entire area in the treating tank or a large part of the same, it is not necessary to provide any specific dam wall because, in such a case, the wall of the treating tank achieves the same function as the dam wall.

Figure 5:
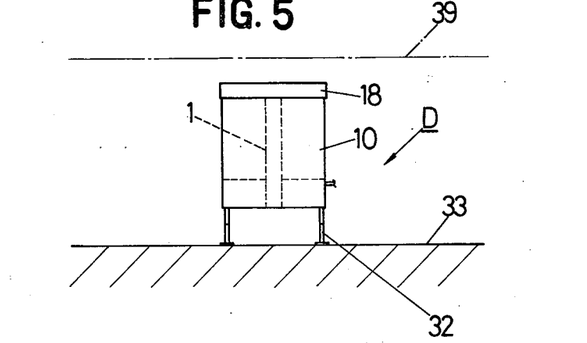
FIG. 5 is a schematic front elevational view of a water purifier having no buoyancy chamber and disposed in water.

In the embodiment shown in FIG. 1, the protecting sleeve has provided on the outer peripheral surface the buoyancy chamber 17 so that the water purifier as a whole is installed in a submerged but floating manner. This, however, is not essential and the water purifier may be fixed to the bottom of a swimming pool or the like by, for example, several legs 32 attached to the lower end of the protecting sleeve 10 and fixed to the bottom 33 as is the water purifier D shown in FIG. 5.

The installation of the water purifier A in a submerged but floating manner as shown in FIG. 1 is advantageous in that the water purifier can be placed at any position and at a constant depth below the water surface regardless of the level of the water surface above the bottom and that the location of the water purifier can be shifted or changed as desired without substantial difficulty. It is to be noted also that, when the water purifier is fixedly situated on the bottom of the water tank or the like, it is possible to fixedly place the water purifier on a pedestal protruding from the bottom or by means of supporting members rigidly connected to the walls of the water tank or the like. Thus, the water purifier of the invention may be fixed by any suitable fixing structure.

Figure 3:
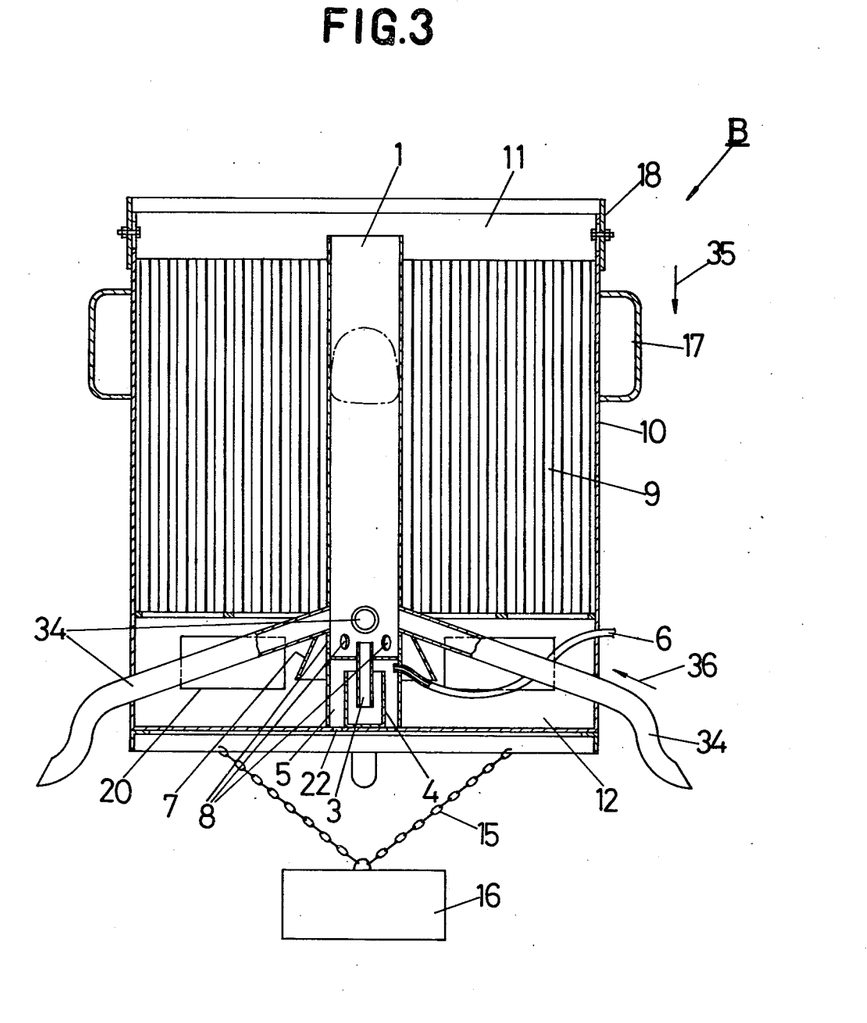
FIG. 3 is a vertical sectional view of a water purifier in accordance with another embodiment of the invention.

In a water purifier B shown in FIG. 3, four additional water suction hoses 34 are connected to the portion of the wall of the cylinder 1 above the water sucking holes 8 and extend generally radially. The other ends of the water suction hoses are open to the outside of the protecting sleeve 10. In this water purifier B, the part of the water which has overflowed the auxiliary dam wall 18 is recycled through the water suction hoses 34 as indicated by arrows 35 and 36. In this case, it is necessary to limit the length of time of the contact treatment to a predetermined period of, for example, two days, taking into account the ratio between the rate of water drawn through the water suction holes 8 and the rate of water drawn through the water suction hoses 34, as well as the pumping or water displacing capacity of the cylinder 1. If the water purifier is intended for removing mainly weeds or ammoniacal nitrogen, the length of time of contact treatment within the predetermined period can be selected to be comparatively short, because it is considered that such an object can be attained by a contact treatment of a comparatively short length of time.

Figure 4:
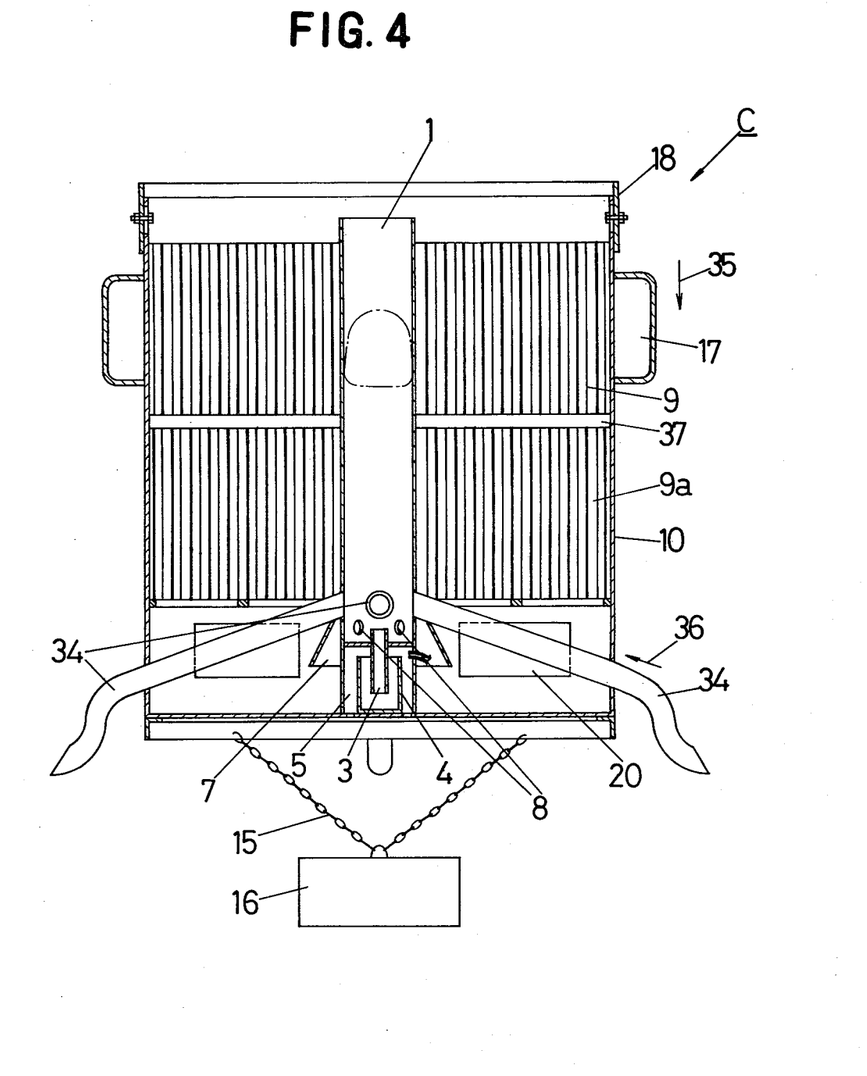
FIG. 4 is a vertical sectional view of a water purifier in accordance with still another embodiment having two stages of honeycomb tube structure.

In the water purifier C shown in FIG. 4, two stages 9 and 9a of honeycomb tube structure are arranged as illustrated with a slight gap 37 left therebetween. The gap 37 left between the two stages 9 and 9a of honeycomb tube structure is effective in producing a turbulency of water flowing down through the tubes of the honeycomb stages 9 and 9a to improve the efficiency of purification of water by the contact treatment. The honeycomb tube structure is usually fabricated to have an axial length of about 1 m, mainly for reasons concerning the production. Therefore, when the honeycomb tube structure is required to have a length of 2 m or 3 m, it is preferred to arrange and connect two or three honeycomb tube structures in the form of stages with a slight gap between each successive stage.

Figure 6:
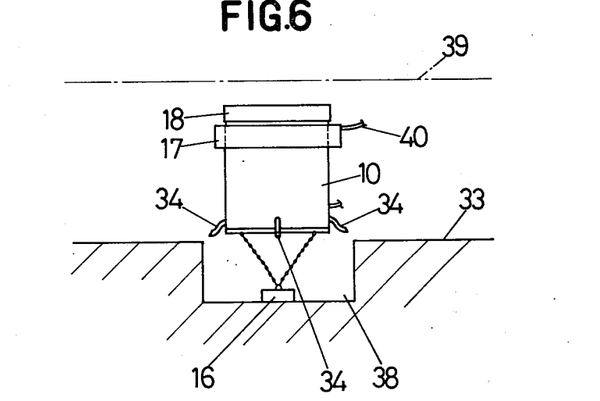

FIG. 6 shows how the water purifier of the invention is installed when the water depth in the area requiring the water purification is small or when it is necessary to keep a predetermined distance between the water level 39 and the upper edge of the dam wall 18. For instance, a distance of 1.5 m is strictly required between the water surface 39 and the upper edge of the dam wall 18 in a speedboat racing area. In this case, therefore, the water purifier is situated on the bottom of a recess 38 formed in the bottom 33 so as to provide the required distance between the upper edge of the dam wall 18 and the water surface 39. It is also possible to provide means to cause the water purifier as a whole to sink into the recess 38 when desired, i.e. during the running of the speedboats so that they can clear the water purifier.

Figure 7:
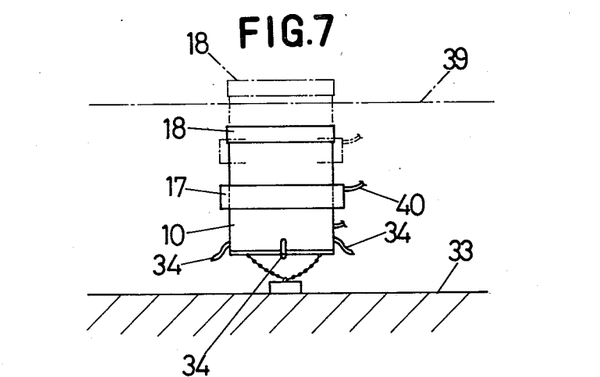
FIG. 7 is a schematic front elevational view of a water purifier floating on the water surface.

Referring now to FIG. 7, the water purifier is positioned to float by the buoyancy thereof such that the upper end of the dam wall 18 projects above the water surface 39. In this case, the water which has come out of the cylinder is caused to fall vigorously into the tubes of the honeycombed tube structure because the dam wall 18 projects above the water surface 39, so that the water flows down the tubes at an increased velocity to effectively remove foreign matter such as weeds which may be deposited on the inner surfaces of the tubes. In FIG. 7, reference numeral 40 designates an air charging tube for charging the buoyancy chamber with air.

Figure 8:
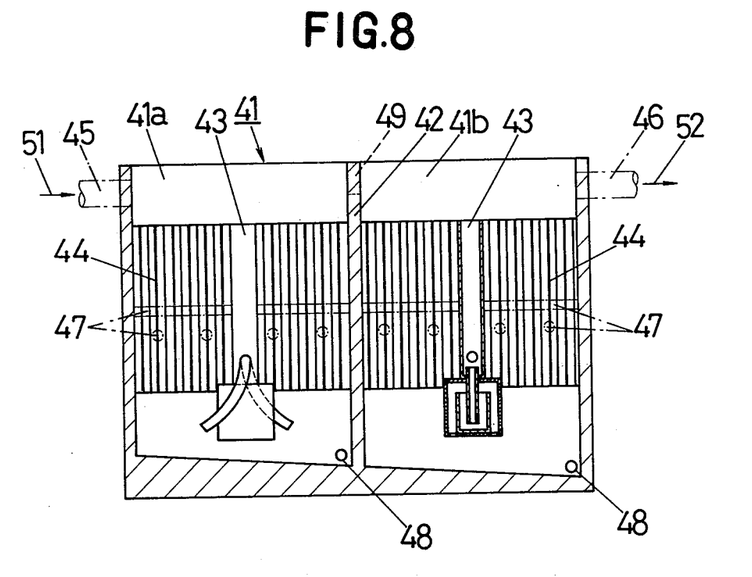
Figure 9:
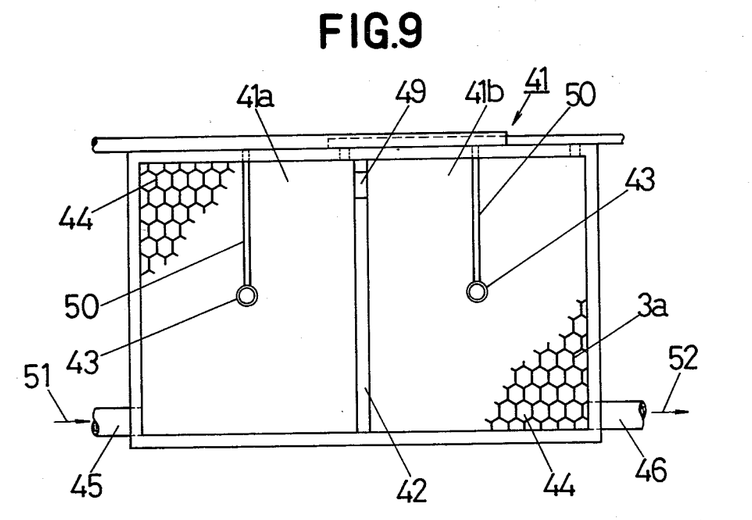
FIG. 9 is a schematic plan view of the system shown in FIG. 8.

Referring now to FIGS. 8 and 9, there is shown an arrangement for efficiently purifying the water in a water tank 41. To this end, the space in the water tank 41 is divided into two sections 41a and 41b by means of a partition wall 42. Each of the two sections 41a and 41b is provided with a central vertical cylinder 43 and a honeycomb tube structure 44 consisting of a multiplicity of tubes arranged concentrically around the cylinder 43. Thus, a water purifier according to the invention is installed in each of the two sections 41a and 41b of the space in the water tank 41. A water inlet pipe 45 opens into the upper portion of the wall of the section 41a, while a water outlet pipe 46 is connected in the upper portion of the wall defining the section 41b.

In operation, water to be treated is introduced into the first section 41a of the water tank 41 through the water inlet pipe 45 as indicated by the arrow 51 and is recycled in the section 41a through the honeycomb tube structure 44 and the cylinder 43. The water is then moved into the section 41b through a water passageway 49 formed in an upper portion of the partition wall 42 and is purified by being recycled through the honeycomb tube structure 44 and the cylinder 43 in the second section 41b. The water thus purified is discharged to the outside through the water outlet pipe 46 as indicated by the arrow 52.

In the arrangement shown in FIG. 8, transverse holes 47 are formed across the tubes of the honeycomb tube structure, which play the same role as the gap 37 between adjacent stages of the honeycomb tube structures described before in connection with FIG. 4, i.e. to produce turbulency of flow of water and to equalize the flow rate of water in all tubes of the honeycomb tube structure. From FIG. 8, it will be seen that each section of the water tank 41 is provided at its lowermost portion with a drain port 48 for discharging sludge, e.g. separated biofilm or the like, accumulated on the bottom of the water tank 41. A reference numeral 50 in FIG. 9 designates an air supply pipe through which compressed air is supplied to the cylinder 43 in each section of the water tank 41. In this arrangement, the walls defining the water tank 41 serve as protecting sleeves for the honeycomb tube structure 44.

It will be seen that the water supplied to the water tank 41 is continuously and efficiently purified. When the water tank 1 is ample enough to accomodate three or more water purifier units of the invention, the internal space of the water tank is divided by partition walls into three or more sections each being filled with a water purifier unit. By so doing, it is possible to attain a highly efficient water purification as in the case of the embodiment described in connection with FIGS. 8 and 9.

The water purifiers described in connection with FIGS. 1 thru 7 are suitable for use in the case where the purification of a large quantity of water over a wide area is required, e.g. in the case of purification of water in lakes and marshes, dams, speedboat racing areas, swimming pools or the like. In contrast, the water purifier shown in FIGS. 8 and 9, positioned in a water disposal tank, is suited for use in continuously treating the water introduced into the tank at a constant flow rate to purify the water to a predetermined extent before the water is discharged. Thus, the water purifier of the embodiment shown in FIGS. 8 and 9 can suitably be used for the purification of domestic water before it is supplied as well as for the disposal of wasted domestic water or industrial waste water.

As has been described, in the water purifier in accordance with the invention, a multiplicity of tubes are densely arranged in a honeycomb tube structure positioned concentrically around a cylinder into which compressed air and water are introduced intermittently. It is, therefore, possible to uniformly distribute the water to all tubes even if the honeycomb structure extends over a large area, for example, 4 m long and 4 m wide. In addition, the intermittent supply of the water causes a pressure variation of water so as to cause a turbulency of the flow of water in the tubes thereby to effectively remove the foreign matter attached to the surface of the biomembrane while promoting the separation of the dead or old biofilm. Furthermore, the contact between the water to be treated and the biofilm is enhanced by the turbulency of the water so that the water is effectively cleaned and purified even if the water purifier is immersed in a large volume of water. Furthermore, weeds or the like attaching to the inner surfaces of tubes of the honeycomb tube structure naturally fall down to eliminate any clogging of the tubes. This in turn obviates the possibility of trouble after the water purifier is put into practical use and, hence, facilitates the maintenence.

What is claimed is:
1. A water purifier comprising:
 a cylinder having a partition thereacross defining an air chamber at the lower end thereof and having water suction openings therein just above said par- tition and opening into said cylinder, the bottom of said air chamber having bottom openings therein;

a sleeve on the bottom of said air chamber and extending up into said chamber to a point spaced from said partition, said bottom openings being around the outside of said sleeve;

a ventilation tube extending through said partition into said cylinder from within said sleeve;

means for introducing compressed air into said air chamber for producing successive flows of air upwardly through said ventilation tube into said cylinder to form a plurality of successive masses of air filling said cylinder and moving upwardly in said cylinder for pumping successive masses of water to be purified up said cylinder;

a plurality of unfilled tubes packed in a side-by-side relation in at least one honeycomb tube structure around and laterally supported by said cylinder with the tops open to receive water from the successive masses of water from the top of said cylinder and extending straight through the honeycomb structure to cause the water to flow down through the tubes for purification, the bottoms of the tubes ending at a position above the level of said water suction openings and being open for discharging the water into the space around said cylinder adjacent said suction openings; and a protecting sleeve around and protecting said honeycomb structure.

2. A water purifier as claimed in claim 1 in which the upper end of said protecting sleeve projects upwardly to a level above the level of the upper end of said honeycomb tube structure.

3. A water purifier as claimed in claim 1 wherein there is a plurality of honeycomb tube structures one above the other with a space therebetween.

4. A water purifier as claimed in claim 1 further comprising a plurality of water suction hoses connected to and opening into said cylinder above said suction holes, the other ends of said hoses extending outside said protecting sleeve.

5. A water purifier as claimed in claim 1 wherein said protecting sleeve is constituted by the wall of a tank for holding water to be treated, the bottom of said tank being spaced below the bottom of said honeycomb tube structure.

* * * * *